United States Patent [19]

Grubman

[11] 4,181,096
[45] Jan. 1, 1980

[54] PET AND BABY TOILET SEAT

[76] Inventor: Moe M. Grubman, 99-32-66 Rd., Rego Park, N.Y. 11374

[21] Appl. No.: 887,001

[22] Filed: Mar. 16, 1978

[51] Int. Cl.² .................... A01K 1/035; E03D 11/02
[52] U.S. Cl. .............................................. 119/1; 4/1
[58] Field of Search ................. 119/1; 4/1, 239, 185, 4/DIG. 5

[56] References Cited

U.S. PATENT DOCUMENTS

| | | | |
|---|---|---|---|
| 817,731 | 4/1906 | Baily | 4/239 |
| 1,737,163 | 11/1929 | Keppinger | 4/239 |
| 2,791,780 | 5/1957 | Krischer | 4/1 |
| 3,603,290 | 9/1971 | O'Rork | 119/1 |
| 4,117,555 | 10/1978 | Dennis | 119/1 |

Primary Examiner—Hugh R. Chamblee

[57] ABSTRACT

In a preferred embodiment of the invention, a toilet seat element having an upper planar or flat surface with an oblong hole therethrough wide at a back portion and tapered to a narrow width at a forward portion of the hole, has an uprightly mountable back-shield element which may serve alternately as a urinal or a back for support of a backwardly-leaning child, alternately positionable at any of different mounting positions located along a length of the hole from the wider portion to the narrow portion, with the back-shield element extending across the hole transversely along the width thereof such that when positioned near the back a wider hole is exposed and when positioned near the front a narrower hole is exposed, and with a ramp mountable at alternate positions providing for the climbing to the toilet seat element from the floor level, and each of the ramp and the back-shield element mounting mechanisms also providing clamping mechanisms preventing the toilet seat element from shifting laterally thus making the toilet seat element sturdy.

11 Claims, 9 Drawing Figures

U.S. Patent    Jan. 1, 1980    Sheet 2 of 2    4,181,096
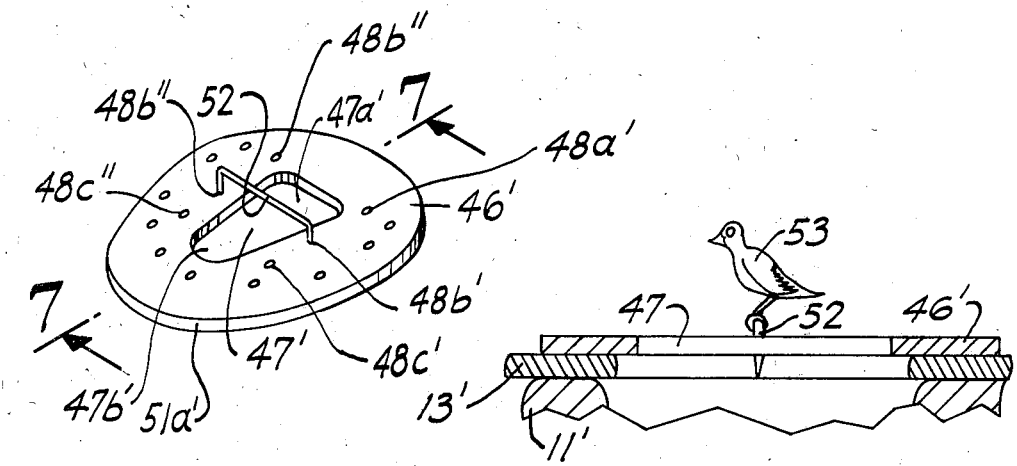
FIG. 6
FIG. 7
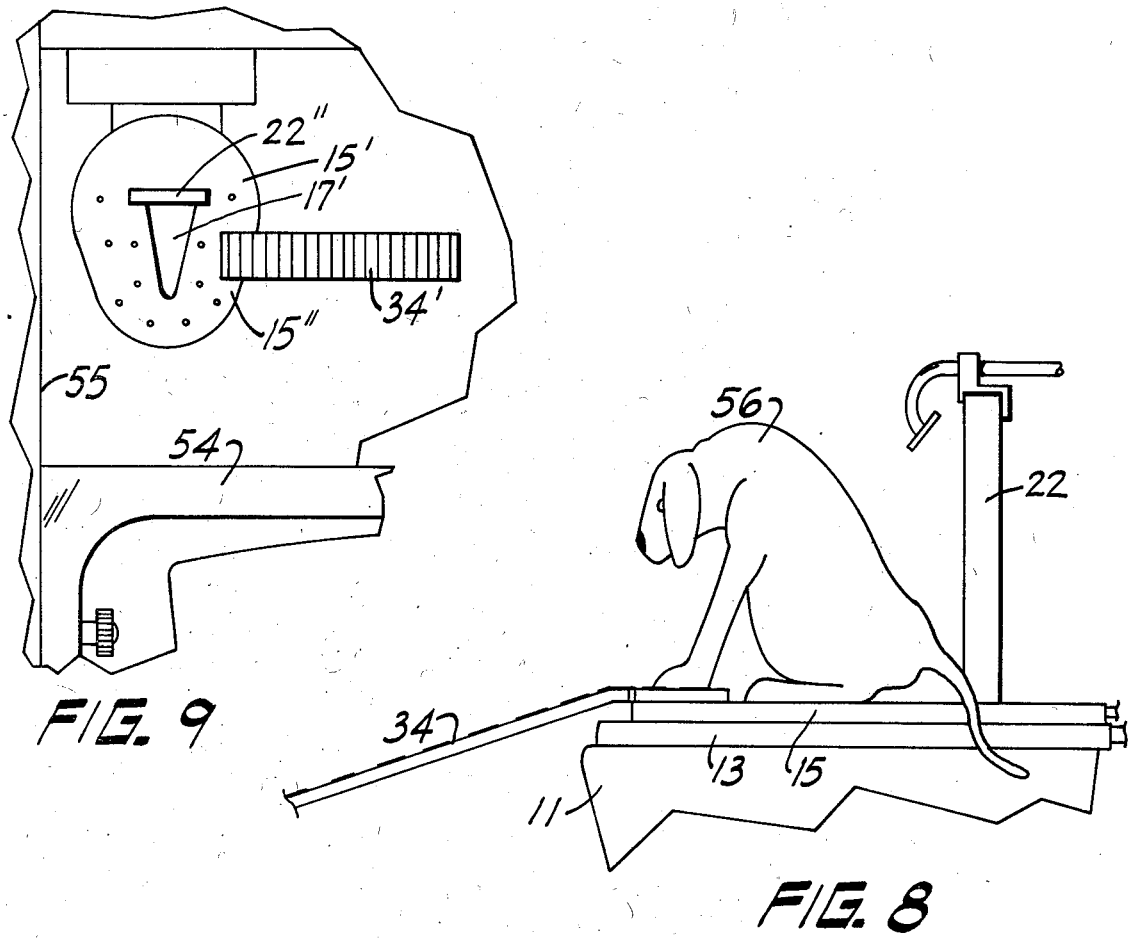
FIG. 9
FIG. 8

PET AND BABY TOILET SEAT

This invention is directed to a novel toilet seat adapted for each of small children and pets for the use of the conventional toilet by the children and/or pets.

BACKGROUND TO THE INVENTION

Prior to the present invention, there have existed various patents directed to toilets for pets, such as U.S. Pat. Nos. 3,747,563/1973, and 3,318,285/1967, and 3,178,398/1965, and 3,762,369/1973, and 3,817,213/1974, and 2,579,792, as well as units for positioning onto conventional toilets over the bowl, such as U.S. Pat. Nos. 2,053,594/1936 and 2,584,656/1952. While U.S. Pat. Nos. 3,173,398 and 3,817,213 and 2,579,797 each disclose a form of ramp, such is not associated with the utility of making use of a conventional toilet. Each of the latter noted U.S. Pat. Nos. 2,584,656 and 2,053,594 merely are for the clamping of rimmed vessels having a conventional hole therein, onto a toilet bowl above the hole thereof; such structures are not of a character readily accessible to a small child nor to a pet devoid of adult human personal assistance, and does not provide any natural environmental elements such as an erect structure that might normally encourage urination by a pet, or reduce or adapt the size of the hole to the size of the pet in order to avoid frightening the child or pet by exposure to too large a hole or too small a hole.

It is apparent from the preceding, that there are many desired features still missing from prior available structures for small children and for the training of pets for in-house use of a conventional toilet.

In conjunction with the heretofore deficiences of in-house pet toilets, a recent New York law was enacted for $100 fines for dog owners who do not clean up after their pets on streets and sidewalks in New York city. Aside from stray dogs which as of February 1978 have swelled to a reported more than 400,000 in New York city, licensed and unlicensed dogs together reportedly dump about 250,000 pound of solid waste and 150,000 gallons of urine onto city streets of New York city each and every day, summing three to four million pounds and about two million gallons per year. The problem is merely characterized by the New York city data, but is common to all cities, large and small. The need for improved in-house toilets for pets is more than apparent.

SUMMARY OF THE INVENTION

Accordingly, objects of the present invention include the overcoming and/or avoiding of problems and difficulties of the types discussed above, together with the obtaining of novel advantages and utilities not heretofore available.

Another object is to obtain a novel toilet structure having a shape, design and mechanism adapted for alternate use by either a small child of various alternate ages, and a pet such as a cat or a dog of any of various sizes and types.

Another object is to obtain variable mounting options for making the device adaptable to limited spaces of different shapes in a variety of bathrooms of differing designs and layouts.

Another object is to a baby and pet toilet which is sturdily anchored against lateral shifting on the toilet bowl or seat, to avoid frightening the child or pet.

Another object is to provide a urinal for a child or pet to urinate against in a natural fashion, mountable on a conventional comode or toilet.

Another object is to provide handles for holding-steady by a child seated on the toilet, adding to the feeling of security of the child.

Another object is to entrap urine during urination by a child or pet, and channel the same into the conventional toilet bowl.

Another object is to obtain a detachable washing mechanism mountable with a urinal onto a conventional toilet.

Another object is to provide a structure alterately utilizable as a toilet back-support for a child, or a urinal for a child or animal pet.

Another object is to obtain a mechanism and device of flushing the conventional commode or toilet by a small child or pet.

Other objects become apparent from the preceding and following disclosure.

One or more of the preceding objects are obtained by the invention as disclosed herein as typically illustrated in the following drawings as merely representative of the invention for better understanding thereof but not limiting the scope of the invention to the merely illustrative embodiments shown.

Broadly the invention may be defined as a toilet seat element having a flat or planar upper surface with an oblong through-space passage or hole therethrough tapered from a wider width at a back end in a preferred embodiment, to a narrowed width at a forward end, and having an uprightly mountable urinal back-shield element mountable at alternate positions along the various widths of the hole, such that a wide-hole or a narrow hole may be exposed as desired and preselected and the back-shield element mounted, in accord with the size of the child or dog or cat, as the case may be.

Preferably there is provided mechanism for the mounting of a handle or handle-bar at one or preferably both sides of the hole, extending along the length of the oblong hole or through-space.

There is included a ramp and mechanism for the mounting of the same, preferably at any of alternate positions around the periphery of the toilet seat element so as to be adapted for use in accord with available space and shape of the particular bath room with which the ramp is to be utilized, for the climbing from floor level to the planar upper surface of the toilet seat element.

In another variation of the invention, preferably the holes, aperatures, or other attaching mechanisms for the mounting of the handles or handle-bars, include mounting position points with one such point on each of opposite lateral sides of the through-space passage, and one of the handles or handle-bars or other perch device is mountable at opposite ends thereof at those points with the handle, handle-bar or perch device extending transversely across the length of the through-space passage at about a mid-point of the imaginary longitudinal axis of the through-space passage, preferably, thereby providing a perch for a pet bird. It has been heretofore discovered that birds may be trained to go to a particular perch before defecating. Accordingly, in this above-noted preferred embodiment, the present invention is also easily adaptable to use of a pet bird of any of varying sizes. Preferably the perch-portion is elevated somewhat, such as one, two or three inches or so, such being conducive to a bird to alighting thereon; however, it should be noted that a handle or handle-bar of the present invention as illustrated meets that preferred elevated situation already.

The invention may be better understood by making reference to the following Figures.

THE FIGURES

FIG. 6 illustrates an elevation plan top view of an embodiment substantially corresponding to that of FIG. 4, but showing the employment of solely one handle or perch structure mounted as adapted for use as a bird perch, shown in perspective side-front view.

FIG. 7 illustrates a view as the FIG. 6 embodiment would symbolically appear when resting atop a conventional toilet seat as taken in cross-section along line 7—7 of FIG. 6.

FIG. 8 illustrates an embodiment in side view symbolically, such as typically that of FIG. 1, having a dog or pooch positioned thereon in a proper position for depositing its feces, shown in side view, the figure being solely an in-part illustration.

FIG. 9 illustrates diagrammatically an elevation plan view of the floor and toilet fixtures and bath tub layout and plan as an illustration of an embodiment of typically FIGS. 1 or 4 where the ramp would advantageously be positioned at a side location because of lack of space in front of the commode, shown merely symbollically.

DETAILED DESCRIPTION OF THE INVENTION

The previously described illustrative embodiment of the above-noted Figures will be now described relative to details of the respective Figures.

Figure 4:
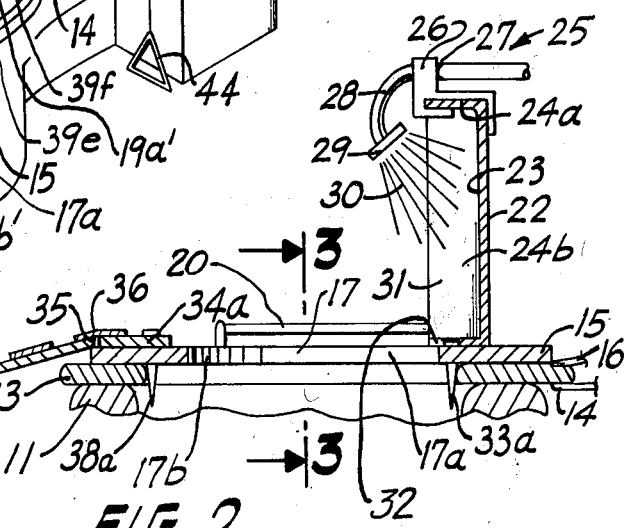
FIG. 4 illustrates an alternate preferred embodiment of a detached toilet seat of the invention not requiring fixed attachment to the other toilet structure, also showing handles in exploded view relative to their mounting positions.

FIGS. 1, 2, 3, 5, 8 and 9 are basically similar embodiments if not identical where indicated previously, and in like manner the embodiments of FIGS. 4, 6 and 7 are basically similar to one-another, as well as being mere variations from the others, although inventive variations. Accordingly, common numerals are utilized, differing only in further designation to distinguish specifically which Figures are being referred to. Therefore, there will not be redundant repetitive descriptions of the same parts or elements, once such has been already described.

In particular reference to FIGS. 1 through 3, and 5 and 8, there is shown a typical commode bowl structure 11 and water closet therebehind, having mounted thereon the conventional toilet seat 13 and also the novel pet and baby toilet seat and accessories thereof broadly designated as 10. The novel pet and baby toilet seat 15 is mounted by hinge structure 16 onto the hinge bar 12, and likewise the conventional toilet seat 13 is mounted by hinge structure 14 onto the hinge bar 12.

The toilet seat 15 has a through-space passage 17 having a greater width at location 17a near the back and a lesser width at a forward location 17b, narrowing in width from back to front typically and preferably in a tapering manner as shown, in movement (locations) ranging along the longitudinal axis of the passage extending from back to front.

The toilet seat 15 has a substantially planar, i.e. flat, upper surface 18, at least in the areas on which a pet or child would come into contact when climbing upon the toilet seat 15 or when seated thereon; this important feature makes possible the safe mounting and resting on the toilet seat in a steady manner, and serves to give the pet or child a feeling of security and confidence, as contrasted to a dangerous and frightening oval or curved surface.

Figure 1:
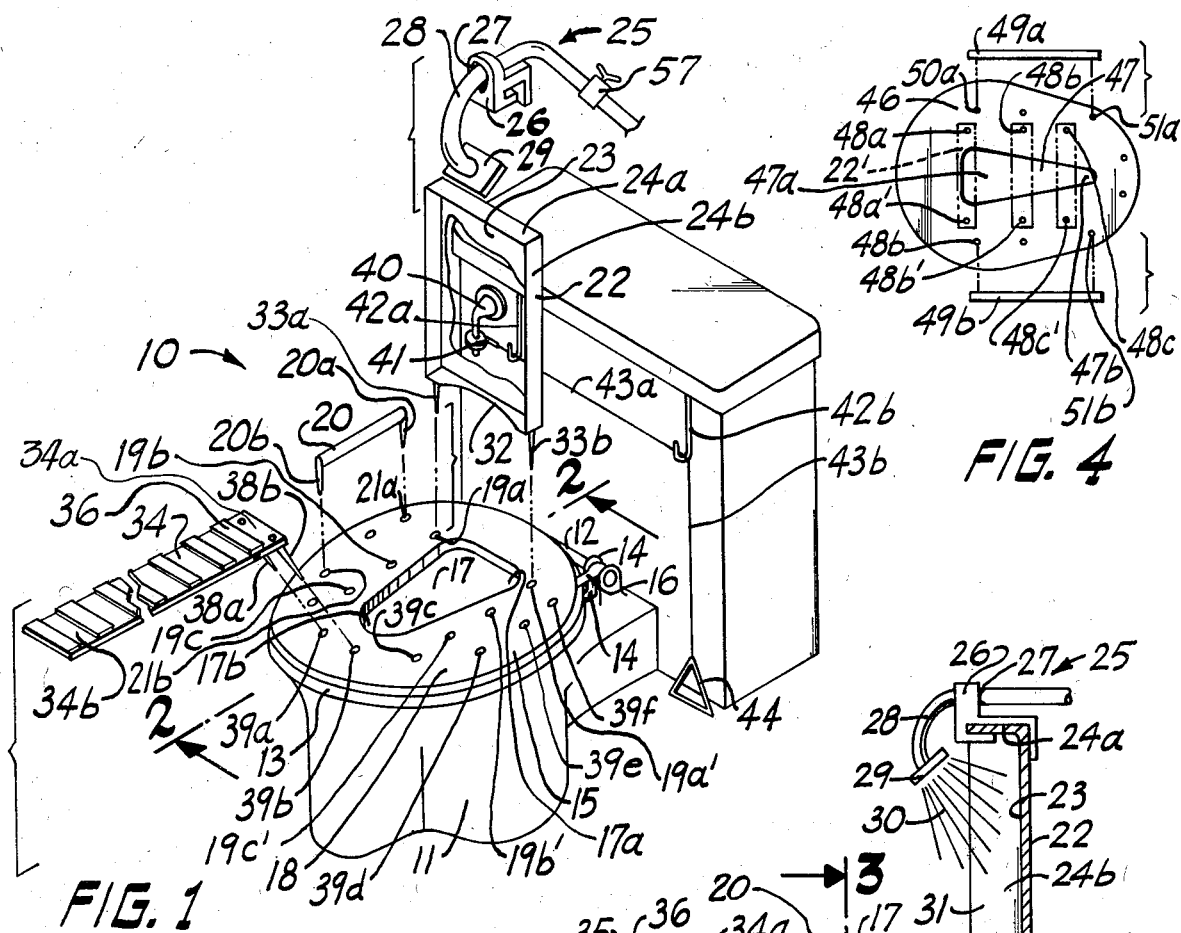
FIG. 1 illustrates diagrammatically and symbolically a perspective front side view of a typical toilet including as an upper lid thereof the novel toilet seat and accessories thereof, much of which is illustrated in exploded view and with partial cut-away.
Figure 2:
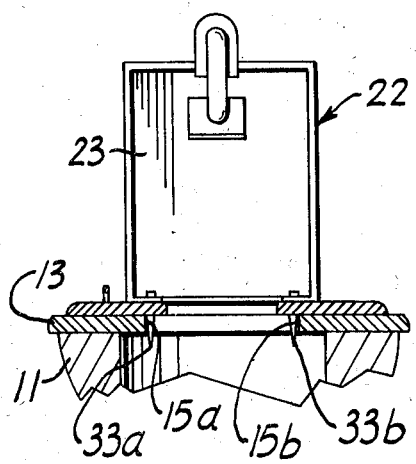
FIG. 2 illustrates a cross-sectional view as taken along lines 2—2 of FIG. 1.

Within the flat upper surface 18 are located a plurality of apertures which preferably extend through the thickness of the toilet seat 15 such that when the mounting prongs 38a and 38b of the ramp 34 are mounted in seat apertures 39a and 39b for example, as shown in FIGS. 1 and 2, the prongs are positioned against the edge of the conventional toilet seat 13 thus serving as an anchoring brace thereby preventing the shifting of the toilet seat 15 to and fro from forward to backward on the supporting conventional toilet seat 13. In like manner, when the prongs 38a and 38b are mounted in laterally located holes or aperatures 39d and 39e when the ramp is positioned along-side as typically shown in FIG. 9, the prongs would then still brace against the seat 13 in the same manner as shown in FIG. 1, except to prevent lateral shifting in the same manner that the prongs 33a and 33b shown in FIG. 3 prevent lateral shifting of the seat 15 on the lower seat 13.

Figure 3:
FIG. 3 illustrates a cross-sectional view as taken along lines 3—3 of FIG. 2

In like manner, the prongs 33a and 33b of FIGS. 1, 2, and 3 extend through the apertures 19a and 19a' to prevent both the rearward shifting of the seat 15, and the lateral shifting of the seat 15 on the lower seat 13. Alternate pairs of mounting aperatures are 19b–19b', and 19c–19c', provided for moving the back-shield element 22 from the FIG. 1-rearward position for use by a large dog, other pet or child, to an intermediate 19b–19b' position for a smaller pet or child, or to a forward 19c–19c' location for a very small pet or child. The back-shield element 22 may serve a multiple purpose and utility, namely that of a back rest for a child, or for a more basic purpose—in so far as being repositionable as above-described—of regulating the length and exposed-width of the through-space passage 17 in order to prevent a realistic possibility of otherwise falling into the interior space of the commode bowl and as well at least overcoming fear of the pet or child that such might occur; it is noted that for either pet or child there otherwise would truly exist a hazard of the conventional commode toilet seat that a pet or child could easily fall head-first thereinto and drown for failure of being able to withdraw from such position. Additionally, however, the back-shield element 22 may and is designed preferably as shown to be utilized as a men's or boy's (child's urinal) once the pet or child climbed up onto the flat surface 18. Being a flat surface, the possibility of falling therefrom is minimized, and the child may maneuver his organ as to direct urine during urination, rear-wardly against the back-shield element 22 against inner back wall 23 between forwardly-extending side flanges 24b beneath forwardly-extending top flange 24a, whereupon while standing the child may cause the urine to drain downwardly onto the bottom forwardly-extending flange through the concave space of the recessed edge 32 of the lower flange.

As previously discussed, there are a plurality of available mounting apertures for the mounting of the prongs 38a and 38b, providing alternate mounting positions circumscribingly around the edge of the seat 15, such as 39a through 19f, as well as other such aperture not numbered, and some of these apertures being numbered as apertures 21a and 21b; the apertures 21a and 21b are illustrated in the FIG. 1 and FIG. 2 as occupied by the handle prongs 20a and 20b respectively; while not illustrated, a corresponding handle and prongs thereof may be mounted on the opposite side, such as within the apertures 39d and 39f, in the manner as typically illustrated in the FIG. 4 embodiment. It will be noted further that preferably the handles are of a sufficiently snug fit by the handle prongs 20a and 20b in the respective mounting apertures therefor, as to provide for a forced wedge fit providing thereby for secure anchoring thereof in order that a child may safely rely upon the same for security against falling or wobbling while sitting upon the surface 18.

It is to be recognized that the exact positions of the various apertures such as 39a, 39b, and the like, and likewise of the apertures 24a and 24b, and likewise of the apertures 19a, 19a', 19b, 19b' and the like, are not intended to be represented by the figures, except for specificically above-noted preferred positions thereof, and such positions may be varied in the manufacture thereof for adaptability to various desired shapes of commode bowls, as the case may be.

There is preferably provided an optional spray unit 25 for the mounting thereof upon the upper flange 24a for sanitary purposes of flushing down intermittently or continually the inside wall 23. It is further noted that a particular advantage of this back-shield element 22 arises form the well known fact that most dogs will be more easily trained to urinate if there is a vertical surface against which the dog may direct the urine; the back-shield element provides such a vertical surface, making training of the dog much easier, as well as such being adaptable to the normal habits of dogs in their usual manner of urinating. The spray unit typically includes a feed line 28 having a valve 57 therein, with the feed line 28 passing through hole 27 of support structure 26, and having sprayer 29 thereof spraying spray 30 of water as shown in FIG. 2, mounted on upper flange 24a, spraying into space 31 against rearward inner wall 23.

It is to be understood that the structure 26 is semi-rigid and thus sufficiently flexible as to be slipped into the mounting state on a rigid back-shield element 22 and upper flange 24a or alternately the structure 26 is rigid and the flange 24a is at least to some extent flexible or bendable.

The ramp 34 has the mounting end 34 flexibly mounted by typically a leather or plastic member 36 to the remaining portion which includes the floor-resting portion-end 34b; the remaining ramp stepped portions may likewise be of plastic, wood, leather or the like, but a material such as leather is preferred since the leather provides for a less slippery and substantial stepping mat for pets and children alike, as compared to a plastic or wooden material. Accordingly, as noted-above, ends 34a and 34b are interconnected over space 35 by the plastic or leather member 36 which is flexible to permit the end 34a to flex or hing downwardly flatly upon the flat surface 18.

Figure 5:
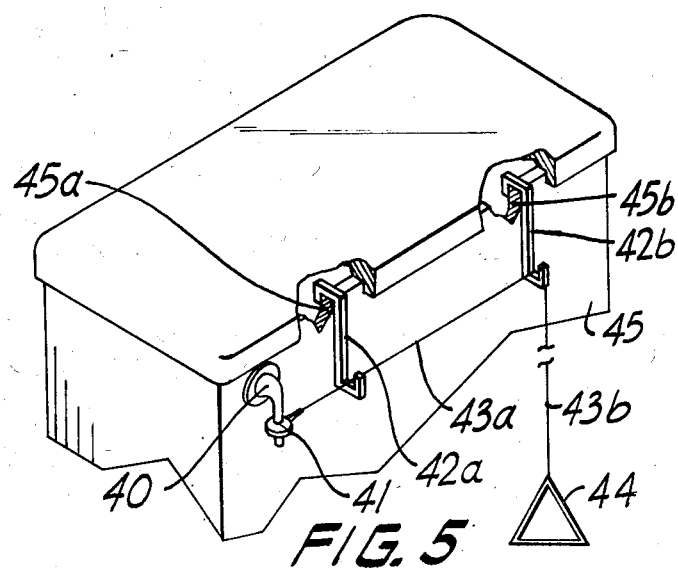
FIG. 5 illustrates in greater detail and clarity the structure and shapes and mechanism of the toilet-flushing device also illustrated in FIG. 1, in this Figure as a perspective view with partial cut-away.

The FIGS. 1 and 5 illustrate the pet or child flushing unit and mechanism, including typically the tank or closet-mounting elements 42a and 42b having upper hooked ends thereof mounted on respective closet edge portions 45a and 45b. The lower hook portions of the elements 42a and 42b provide slidable support for the line 43a attached by anchoring element 41 to the handle 40, at one end of the line 43a, and the far line end 43b being attached to the grasping member 44, preferably of a ring nature but sufficiently large for easy insertion of a child's hand or a pet's paw, for the thereupon pulling downwardly thereon to flush the commode. Such flushing device is a preferred accessory and part of the inventive combination.

FIG. 4 differs basically in not including any hinges for fixed mounting thereof, but as provided before, prongs of the ramp to be utilized therewith, and the like, may provide for making the seat 46 sturdy. Like the seat 15, the upper surface is preferably substantially flat, and the through-space passage 47 tapers from the wide space 47a to the narrow space 47b. While as a different embodiment, the aperatures 48a, 48a', 48b, 48b', 48c, 48c', 50a, 51b are differently numbered as compared to substantially corresponding aperatures of the FIG. 1 illustration, the functions as shown in the FIG. 4 are substantially the same. Additionally illustrated in phantom, however, in the FIG. 4, are alternative positions 22' illustrated for the FIG. 1-illustrated back-shield element 22, as well as handle structures 49a and 49b on each of opposite sides of the through-space passage 47.

In like manner, the aperatures of the FIG. 6 seat embodiment for seat 46', substantially correspond in number and function to that of FIG. 4, except that in this embodiment there is illustrated a handle or perch structure 52 positioned for the utilization thereof by a bird as a resting and perching place for allowing the bird to deposit into the commode. Such is further symbolically illustrated in the diagrammatic drawing of FIG. 7.

In the FIG. 8 embodiment, likewise there is symbolically illustrated the pooch 56 resting in proper position on seat 15.

In FIG. 9, there is shown a symbolic home bathroom and arrangement typically of the bath tub very close to the commode bowl structure, showing the bathtub 54 leaving inadequate room for the ramp 34', which ramp is accordingly mounted on a lateral face of the seat 15"; in like manner the wall 55 is very close to the seat 15'. Thus, this invention in this Figure is further illustrated as to the adaptability to rooms and arrangements of different sorts and varieties.

It is within the scope of the present invention to make variations and modifications and substitutions within ordinary skill of the ordinary artisan in this art.

Particular advantages of the above-described invention include the fact that even small baby can easily train a pet, and the price (low cost) of the unit is less than the cost of a trip to the veternarian. As well, children playing in the yard or street can avoid becoming contaminated, and thus are protected against diseases such as salmonellosis. There is also the advantage that neither aged(old) persons nor pets are required to go-out into the cold weather, if the present invention is employed.

I claim:

1. A toilet seat device comprising in combination: a toilet seat element having a planar upper surface with a through-space passage therethrough substantially centrally thereof, the through-space passage being of a substantially oblong shape wider at a rearward first end and tapered to a narrow width at a remaining opposite forward second end thereof, and a back-shield element having shield-mounting means for positioning erectly at any of alternate positions above and extending transversely across said through-space passage ranging from a position substantially at said rearward first end of wider width to a position substantially at and spaced-from said remaining opposite forward second end of narrow width, said back-shield element being mounted on said toilet seat element at one of said alternate positions detachably adapted such that optionally wide width or narrow width forward through-space forward of the back-shield element may be selected by a predetermined selection for positioning said back-shield element at said any of alternate positions, said back-shield element being structured such that unobstructed free-space exists above the forward through-space forward of said back-shield element between said forward second end and a forward face of said back-shield element.

2. A toilet seat device of claim 1, including a suspended lever means mounted on a toilet cabinet and having a lever handle graspable by a pet animal's paw adapted when pulled downwardly to effect a flushing of a toilet flush handle of the toilet cabinet.

3. A toilet seat device of claim 1, including water-flush means for washing-down a forward-face of the back-shield element, for detachable mounting at an upper portion thereof.

4. A toilet seat device of claim 1, including a bird perch element mounted across said through-space passage.

5. A toilet seat device of claim 1, including handle-bar means for providing a graspable handle mountable along at-least one elongated edge of said through-space passage such that a child may securely hold himself against being unsteady.

6. A toilet seat device of claim 5, including one of said handle-bar means on each of opposite sides of said through-space passage.

7. A toilet seat device of claim 1, including ramp means for providing a climbing structure upon which a pet animal may climb upwardly from a floor level onto said planar upper surface.

8. A toilet seat device of claim 7, including ramp mounting means for mounting an upper end of the ramp means onto the planar upper surface and for concurrently anchoring said toilet seat element against lateral slipping to and fro, the ramp mounting means including anchor elements extending downwardly positionable to brace against an inner periphery of a hole-forming structure therebelow constituting a part of a toilet.

9. A toilet seat device of claim 7, in which said toilet seat element includes ramp-mounting positions spaced around a periphery of the planar upper surface providing alternate mounting positions for the ramp means.

10. A toilet seat device of claim 1, in which said back-shield element includes side flanges extending forwardly when the back-shield element is mounted transversely across the through-space passage along a width thereof, transverse to a width of the through-space passage.

11. A toilet seat device of claim 10, in which the positioning means includes for the back-shield element, shield element-mounting means for concurrently anchoring said toilet seat element against slipping to and fro of the toilet seat element, the shield element-mounting means including anchor shield element extending downwardly positionable to brace against an inner periphery of a hole-forming structure therebelow constituting a part of a toilet.

* * * * *